United States Patent
Li et al.

(10) Patent No.: US 11,189,823 B2
(45) Date of Patent: Nov. 30, 2021

(54) POWER BATTERY AND POSITIVE ELECTRODE PLATE THEREOF

(71) Applicant: Contemporary Amperex Technology Co., Limited, Fujian (CN)

(72) Inventors: Ruifa Li, Fujian (CN); Xiaomei Liu, Fujian (CN); Guopeng Teng, Fujian (CN); Yonggang Xu, Fujian (CN); Bo Li, Fujian (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 183 days.

(21) Appl. No.: 16/435,637

(22) Filed: Jun. 10, 2019

(65) Prior Publication Data

US 2019/0296329 A1 Sep. 26, 2019

Related U.S. Application Data

(63) Continuation of application No. PCT/CN2017/092313, filed on Jul. 9, 2017.

(30) Foreign Application Priority Data

Dec. 8, 2016 (CN) .......................... 201611119962.4

(51) Int. Cl.
*H01M 4/136* (2010.01)
*H01M 4/58* (2010.01)
*H01M 4/62* (2006.01)
*H01M 10/0525* (2010.01)
*H01M 10/058* (2010.01)
*H01M 50/531* (2021.01)

(52) U.S. Cl.
CPC ............. *H01M 4/136* (2013.01); *H01M 4/58* (2013.01); *H01M 4/62* (2013.01); *H01M 4/621* (2013.01); *H01M 4/625* (2013.01); *H01M 10/058* (2013.01); *H01M 10/0525* (2013.01); *H01M 50/531* (2021.01)

(58) Field of Classification Search
CPC ...... H01M 4/136; H01M 50/531; H01M 4/62; H01M 4/58; H01M 4/621; H01M 4/625; H01M 10/0525; H01M 10/058; H01M 4/133; H01M 4/587; H01M 4/382; H01M 10/052; H01M 4/5825; H01M 4/622; Y02E 60/10
See application file for complete search history.

(56) References Cited

U.S. PATENT DOCUMENTS

| | | | |
|---|---|---|---|
| 2011/0049418 A1* | 3/2011 | Dahn | H01M 4/582 252/182.1 |
| 2014/0079999 A1* | 3/2014 | Aoyagi | H01M 4/5825 429/221 |

FOREIGN PATENT DOCUMENTS

KR 1020100060363 * 11/2010 ............. H01M 4/04

OTHER PUBLICATIONS

Machine translation of KR 1020100060363, retrieved from <http://kposd.kipo.go.kr:8088/up/kpion/> on Feb. 3, 2021.*

* cited by examiner

*Primary Examiner* — Cynthia K Walls

(57) ABSTRACT

The present invention provides a power battery and a positive electrode plate thereof. The positive electrode plate includes a positive current collector and a positive active material layer formed on the positive current collector. The positive active material layer contains a mixture of lithium iron phosphate and $FeF_3$, or a mixture of lithium iron phosphate and $LiFe_2F_6$, or a mixture of lithium iron phosphate, $FeF_3$ and $LiFe_2F_6$. $FeF_3$ or $LiFe_2F_6$ has a high gram capacity of more than 200 mAh/g and has a charge and discharge interval close to that of lithium iron phosphate, which can improve the energy density and the safety performance of the power battery.

9 Claims, No Drawings

POWER BATTERY AND POSITIVE ELECTRODE PLATE THEREOF

CROSS REFERENCE TO RELATED APPLICATIONS

The present application is a Continuation Application of PCT Application No. PCT/CN2017/092313 filed on Jul. 9, 2017, which claims the priority of Chinese Patent Application No. 201611119962.4 filed on Dec. 8, 2016. The contents of all of the above are incorporated herein by reference in their entirety.

FIELD OF THE INVENTION

The present invention generally relates to power batteries and, more particularly, relates to a power battery and a positive electrode plate thereof.

BACKGROUND OF THE INVENTION

Lithium iron phosphate power batteries have been widely used in various buses due to desirable circle and storage performance. The theoretical gram capacity of lithium iron phosphate is 170 mAh/g. However, the actual gram capacity available of lithium iron phosphate is only 140 mAh/g. The charge and discharge platform of lithium iron phosphate for graphite is 3.2V. Therefore, the energy density is very low (about 140 Wh/Kg), which limits the mileage of electric vehicles.

It is supposed that, materials having high charge and discharge platform can be used to improve the energy density of lithium iron phosphate (LFP) system. For example, lithium iron phosphate can be mixed with materials having high potential platform, such as nickel cobalt manganese ternary material (NCM) or lithium manganese oxide. However, the charge and discharge interval of nickel cobalt manganese ternary material or lithium manganese oxide is 2.7-4.2V. The charge and discharge platform of nickel cobalt manganese ternary material or lithium manganese oxide is 3.6-3.9V. The charge and discharge capacity of higher than 60% is available between 3.8-4.2V, different from the charge and discharge use interval, i.e. 2.5-3.65V, of lithium iron phosphate, which may lead to poor electrical performance and poor safety performance of the battery cell.

In view of the foregoing, what is needed, therefore, is to provide a power battery and a positive electrode plate thereof having desirable energy density, circle performance and safety performance.

SUMMARY OF THE INVENTION

One object of the present invention is to provide a power battery and a positive electrode plate thereof having desirable energy density, circle performance and safety performance.

According to one embodiment of the present invention, a positive electrode plate of a power battery includes a positive current collector and a positive active material layer formed on the positive current collector, wherein the positive active material layer contains a mixture of lithium iron phosphate and $FeF_3$, or a mixture of lithium iron phosphate and $LiFe_2F_6$, or a mixture of lithium iron phosphate, $FeF_3$ and $LiFe_2F_6$.

In the present invention, the positive active material contains a mixture of lithium iron phosphate and $FeF_3$, or a mixture of lithium iron phosphate and $LiFe_2F_6$, or a mixture of lithium iron phosphate, $FeF_3$ and $LiFe_2F_6$. Lithium intercalation reaction of 1 mol $FeF_3$ is $Li^+ + e^- + FeF_3 \rightarrow LiFeF_3$, wherein the voltage interval is 2.5-4.5V, and the theoretical gram capacity is 237 mAh/g. $LiFe_2F_6$ has the capability of lithium intercalation and deintercalation, 1 mol $FeF_3$ can intercalate 0.5 mol Li, thereby having a stable three rutile structure. The charge and discharge platform of $Li_xFe_2F_6$ (0<x<2) is almost the same as that of LFP, having a gram capacity of more than 200 mAh/g, thereby obtaining higher energy density. The charge interval of $Li_xFe_2F_6$(0<x<2) is 2.5-4.2V, and about 70% of the capacity is available at 2.5-3.8V. The discharge interval of $Li_xFe_2F_6$ (0<x<2) is 3.8-2.5V, which is close to the discharge interval of LFP, i.e. 2.5-3.65V. Therefore, in actual use, even though high voltage upper limit (i.e. 4.2V) is selected, the power battery cannot work at high voltage for a long time. Therefore, gas production of power battery, poor circle performance and safety performance due to high voltage can be avoided.

According to one aspect of the present invention, a weigh content of lithium iron phosphate in the positive active material layer is 5%-95%, preferably 50%-90%.

According to one aspect of the present invention, a weigh content of the positive active material in the positive active material layer is 85%-98%.

According to one aspect of the present invention, the positive active material layer includes a conductive agent and a binder.

According to one aspect of the present invention, a weight content of the conductive agent in the positive active material layer is 1%-5%.

According to one aspect of the present invention, a weight content of the binder in the positive active material layer is 1%-10%.

According to one aspect of the present invention, the conductive agent is selected from a group consisting of acetylene black, flake graphite and conductive carbon black.

According to one aspect of the present invention, the binder is polyvinylidene fluoride.

According to another embodiment of the present invention, a power battery includes:
a battery case; and
a positive electrode plate, a negative electrode plate, a separator, and an electrolyte housed in the battery case;
wherein the positive electrode plate is the positive electrode plate of a power battery of the present invention.

According to one aspect of the present invention, the negative electrode plate includes a layer of lithium powder on a surface thereof, the lithium powder is capable of providing lithium source for $FeF_3$ and/or $LiFe_2F_6$ in the positive electrode plate, and a mass ratio of metal lithium powder to ($FeF_3+LiFe_2F_6$) is more than 1.

According to one aspect of the present invention, the negative active material of the negative electrode plate is selected from a group consisting of graphite, soft carbon, hard carbon and silicon carbon.

Compared with the prior art, $FeF_3$ or $LiFe_2F_6$ has a high gram capacity (more than 200 mAh/g) and has a charge and discharge interval close to that of lithium iron phosphate, which can improve the energy density and the safety performance of the power battery.

DETAILED DESCRIPTION OF THE INVENTION

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

The comparative examples and the examples of the power batteries each is model FFH3D3, having a capacity of 86000 mAh and having a winded structure.

Comparative Example 1

Preparation of positive electrode plate: 4 wt % of binder polyvinylidene fluoride was fully dissolved in the solvent N-methylpyrrolidone (NMP) until the solution was clear. Conductive carbon (supper-P) and active material lithium iron phosphate (LFP) were added into the solution and stirred to obtain a positive slurry, wherein a mass ratio of LFP, supper-P and PVDF was 94:2:4 and the solid content of the positive slurry was 60%. The positive slurry was coated on a positive current collector of aluminum having a thickness of 16 μm. The positive current collector coated with the positive slurry was baked in an oven until the solvent was fully volatilized, so that the coating layer on each surface of the positive current collector had a thickness of 260 μm. The positive current collector with coating layer formed thereon was pressed to obtain the positive electrode plate, wherein the compaction density was 2.2 $g/cm^3$, and the thickness of the positive electrode plate was 169 μm.

Preparation of the negative electrode plate: Graphite, conductive agent supper-P, thickener sodium carboxymethyl cellulose solution, binder styrene butadiene rubber and pure water were fully stirred to obtain a negative slurry, wherein the mass ratio of graphite, conductive agent supper-P, thickener sodium carboxymethyl cellulose solution, binder styrene butadiene rubber and pure water was 95:1.5:0.4:3.1. The negative slurry was coated on a cupper foil to obtain a negative electrode plate after baking and cold press.

Preparation of power battery: The positive electrode plate, the negative electrode plate and the separator (PE monolayer) were winded to obtain a battery cell. The battery cell was packed in a battery case. The battery cell was further baked to remove the solvent. The electrolyte was injected into the battery case, wherein the electrolyte was 1M solution of $LiPF_6$ in the solvent of EC/EMC/DEC, and the mass ratio of EC/EMC/DEC was 5:3:2. The battery case was sealed and subjected to a forming process and an aging process to obtain the power battery.

Comparative Example 2

Preparation of the positive electrode plate: The preparation of the positive electrode plate in comparative example 2 differed from that of comparative example 1 only in that LFP and ternary active material NCM were added, and the mass ratio of LFP to NCM was 7:3. The compaction density of the obtained positive electrode plate was 2.56 $g/cm^3$, and the thickness of the compacted positive electrode plate was 148 μm.

Preparation of the negative electrode plate and preparation of the power battery were the same as those of comparative example 1.

Example 1

Preparation of the positive electrode plate: Preparation of the positive electrode plate in example 1 differed from comparative example 1 only in that the positive active material of a mixture of LFP and $LiFe_2F_6$ were added, and the mass ratio of LFP to $LiFe_2F_6$ was 8.5:1.5.

Preparation of the negative electrode plate: Preparation of the negative electrode plate in example 1 differed from the comparative example 1 in that, after the cold press and baking, a lithium power was provided on one surface of the negative electrode plate to provide lithium source for $LiFe_2F_6$ in the positive electrode plate, wherein a mass ratio of lithium powder to $LiFe_2F_6$ was 1.2.

Example 2

Preparation of the positive electrode plate: Preparation of the positive electrode plate in example 2 differed from example 1 only in that the positive active material of a mixture of LFP and $FeF_3$ were added, and the mass ratio of LFP to $FeF_3$ was 7:3.

Preparation of the negative electrode plate: Preparation of the negative electrode plate in example 1 differed from comparative example 1 only in that, after the cold press and baking, a lithium power was provided on one surface of the negative electrode plate to provide lithium source for $LiFe_2F_6$ in the positive electrode plate, wherein a mass ratio of lithium powder to $LiFe_2F_6$ was 1.2.

Preparation of the power battery was the same as those of comparative example 1.

Example 3

Preparation of the positive electrode plate: Preparation of the positive electrode plate in example 3 differed from example 1 only in that the positive active material of a mixture of LFP, $FeF_3$ and $LiFe_2F_6$ were added, and the mass ratio of LFP:$FeF_3$:$LiFe_2F_6$ was 7:1.5:0.75.

Preparation of the Negative Electrode Plate:

Preparation of the negative electrode plate in example 3 differed from comparative example 1 in that, after the cold press and baking, a lithium power was provided on one surface of the negative electrode plate to provide lithium source for $FeF_3$ and $LiFe_2F_6$ in the positive electrode plate, wherein a mass ratio of lithium powder to $FeF_3$ and $LiFe_2F_6$ was 1.2.

Preparation of the power battery is the same as those of comparative example 1.

Performance Test

The power batteries according to comparative examples 1-2 and examples 1-3 of the present invention were tested. The performance test results were shown in Table 1.

1. Energy Density Test

Reversible discharge capacity and potential platform of each power battery were tested in a potential range of 2.5-4.2V at 1C/1C according to BEV power battery standard capacity test conditions. The weight of each power battery was weighed to calculate the energy density of each power battery.

2. Circle Performance Test

Each power battery was circled at 1C/1C at 45° C. in a voltage range of 2.5-4.2V. Due to the circle test of the power battery was long, the capacity retention rate in the $1000^{th}$ circle was selected and compared.

3. Safety Level Test 1

Abuse test standard of GBT31485 was used to characterize the piercing safety performance, in which acupuncture was defined as a fully charged battery cell being pierced by a steel needle having a diameter of 5-8 mm along a direction vertical to the electrode. The pierced battery cell was observed for 1 hour and the standard of "passed" is no fire, no explosion.

4. Safety Level Test 2

Abuse test standard of GBT31485 was used to characterize the piercing safety performance, in which overcharge was defined as charged to 200% SOC at 1C or to 1.5 times of the charge termination voltage. The standard of "passed" is no fire, no explosion.

TABLE 1

Performance test of the power batteries of the examples and the comparative examples

| | LFP | FeF$_3$ | LiFe$_2$F$_6$ | NCM | Energy density (Wh/Kg) | Capacity retention rate at 45° C. after 1000 circles | Acupuncture failure Level | Overcharge failure Level |
|---|---|---|---|---|---|---|---|---|
| Comparative example 1 | 100% | 0% | 0% | 0% | 132 | 92% | L3 | L3 |
| Comparative example 2 | 70% | 0% | 0% | 30% | 145 | 86% | L4 | L4 |
| Example 1 | 85% | 0% | 15% | 0% | 143 | 90% | L3 | L3 |
| Example 2 | 70% | 30% | 0% | 0% | 143 | 90% | L3 | L3 |
| Example 3 | 70% | 15% | 7.5% | 0% | 143 | 90% | L3 | L3 |

In the present invention, LFP and the mixture of LFP and NCM were used as comparative examples, and the mixture of LFP and LiFe$_2$F$_6$, the mixture of LFP and FeF$_3$ were used as examples. It can be clearly seen from Table 1 that:

1) In comparative example 2, LFP was mixed with 30% NCM. Compared with comparative example 1, the energy density could be improved to 145 Wh/Kg. However, due to the significant difference of the charge platform and the poor thermal stability, the addition of the ternary material will lead to the remarkable deterioration of the circle performance at 45° C. The piercing safety performance and the overcharge test could not be passed.

2) Compared with comparative example 1, examples 1-3 of the present invention each has a remarkably improved energy density which was almost the same at that of comparative example 2 having the mixture of LFP and NCM. However, the circle performance at 45° C. almost has not been changed. In addition, the piercing safety performance and the overcharge test could be passed.

In view of the foregoing, FeF$_3$ or LiFe$_2$F$_6$ have a high gram capacity (more than 200 mAh/g) and have a charge and discharge interval close to that of lithium iron phosphate, which can improve the energy density and the safety performance of the power battery.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments, it should be appreciated that alternative embodiments without departing from the scope of the appended claims. Although specific terms are employed herein, they are used in a generic and descriptive sense only and not for purposes of limitation.

What is claimed is:

1. A power battery, comprising:
 a battery case; and
 a positive electrode plate, a negative electrode plate, a separator, and an electrolyte housed in the battery case; wherein the positive electrode plate comprises a positive current collector and a positive active material layer formed on the positive current collector, the positive active material layer contains a mixture of lithium iron phosphate and FeF$_3$, or a mixture of lithium iron phosphate and LiFe$_2$F$_6$, or a mixture of lithium iron phosphate, FeF$_3$ and LiFe$_2$F$_6$, and wherein the negative electrode plate comprises a layer of lithium powder on a surface thereof, the lithium powder is capable of providing lithium source for FeF$_3$ and/or LiFe$_2$F$_6$ in the positive electrode plate, and a mass ratio of lithium powder to (FeF$_3$+LiFe$_2$F$_6$) is more than 1.

2. The power battery according to claim 1, wherein a weigh content of lithium iron phosphate in the positive active material is 5%-95%.

3. The power battery according to claim 1, wherein a weigh content of lithium iron phosphate in the positive active material is 50%-90%.

4. The power battery according to claim 1, wherein a weigh content of the positive active material in the positive active material layer is 85%-98%.

5. The power battery according to claim 4, wherein the positive active material layer comprises a conductive agent and a binder.

6. The power battery according to claim 5, wherein a weight content of the conductive agent in the positive active material layer is 1%-5%.

7. The power battery according to claim 5, wherein a weight content of the binder in the positive active material layer is 1%-10%.

8. The power battery according to claim 5, wherein the conductive agent is selected from a group consisting of acetylene black, flake graphite and conductive carbon black.

9. The power battery according to claim 5, wherein the binder is polyvinylidene fluoride.

* * * * *